US012508607B2

(12) United States Patent
Tang et al.

(10) Patent No.: US 12,508,607 B2
(45) Date of Patent: Dec. 30, 2025

(54) WATER CURTAIN SYSTEM WITH SWITCH

(71) Applicant: Guangzhou Rising Dragon Recreation Industrial Co., Ltd., Guangzhou (CN)

(72) Inventors: Weixin Tang, Guangzhou (CN); Zhiyuan Yuan, Guangzhou (CN); Xuewen Liu, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 717 days.

(21) Appl. No.: 17/944,293

(22) Filed: Sep. 14, 2022

(65) Prior Publication Data

US 2023/0415175 A1 Dec. 28, 2023

(30) Foreign Application Priority Data

Jun. 28, 2022 (CN) ........................ 202221656175.4

(51) Int. Cl.
*B05B 1/30* (2006.01)
*B05B 15/40* (2018.01)
*B05B 17/08* (2006.01)

(52) U.S. Cl.
CPC ............ *B05B 1/3013* (2013.01); *B05B 15/40* (2018.02); *B05B 17/085* (2013.01)

(58) Field of Classification Search
CPC ....... B05B 1/3013; B05B 1/3046; B05B 1/04; B05B 1/042; B05B 15/40
USPC ............ 239/16, 17, 575, 583, 592, 597, 598
See application file for complete search history.

(56) References Cited

U.S. PATENT DOCUMENTS

| | | | | | |
|---|---|---|---|---|---|
| 1,599,411 | A * | 9/1926 | Gilsenan | B05B 1/044 | 239/595 |
| 3,212,719 | A * | 10/1965 | Di Corpo | B05B 1/1663 | 239/566 |
| 5,843,230 | A * | 12/1998 | Potjer | B05C 5/0258 | 239/597 |
| 6,450,418 | B1 * | 9/2002 | Simpson | E04H 4/148 | 239/16 |

* cited by examiner

*Primary Examiner* — Steven J Ganey
(74) *Attorney, Agent, or Firm* — JEEN IP LAW, LLC

(57) ABSTRACT

A water curtain system with switch, comprising: a main housing, which is integrally formed, comprises a main cavity structure in the middle, a lower part of the main cavity structure is connected to a water inlet pipe part with an inner diameter smaller than that of the main cavity structure, the connecting port between the main cavity structure and the water inlet pipe part is a gate end, an upper part of the main cavity structure is integrally provided with a water outlet base, and an upper part of the water outlet base is provided with an upper cover; a threaded pressing rod, clamped in the main cavity structure above the gate end through a clamping structure, and a lower end of the threaded pressing rod is provided with a water-sealing washer; a pressing rod driver, which drives the threaded pressing rod to rise and fall through threaded cooperation.

11 Claims, 6 Drawing Sheets

WATER CURTAIN SYSTEM WITH SWITCH

CROSS-REFERENCE TO RELATED APPLICATIONS

This application claims priority to Chinese Application Serial No. 202221656175.4, filed on Jun. 28, 2022. The content of the aforementioned application, including any intervening amendments thereto, is incorporated herein by reference.

TECHNICAL FIELD

The present application relates to the technical field of water outlet valves, in particular to a water curtain system with a switch.

BACKGROUND

The traditional water curtain system consists of two separate products with the water curtain system and the switch, and one part is a separate water curtain system, in which the water directly flows out from the water pipe through the interior of the water curtain system to form a water curtain effect. The other part is the on-off valve, which is connected to the water pipe passing through the water curtain system to control the opening and closing of the water curtain system. The installation of the water curtain system is cumbersome and the installation efficiency is low. Due to the complexity of the pipelines of different apartment types, different installation solutions need to be provided, so it is impossible to achieve an integrated and unified standardized installation. This directly improves the cost and efficiency of installation, and because two parts are required respectively, which need to be installed twice, the production cost of the product is also very high.

SUMMARY

The present disclosure provides a water curtain system with a switch to solve the technical problem recognized by the inventor.

A water curtain system with a switch, comprising: a main housing, the main housing is integrally formed, and comprises a main cavity structure in the middle, a lower part of the main cavity structure is connected to a water inlet pipe part with an inner diameter smaller than that of the main cavity structure, the connecting port between the main cavity structure and the water inlet pipe part is a gate end that allows water to flow into the main cavity structure through the water inlet pipe part, an upper part of the main cavity structure is integrally provided with a water outlet base, and an upper part of the water outlet base is provided with an upper cover;

a threaded pressing rod, which is clamped in the main cavity structure above the gate end through a clamping structure, and the lower end of the threaded pressing rod is provided with a water-sealing washer:

a pressing rod driver, which drives the threaded pressing rod to rise and fall through threaded cooperation, so as to complete opening and closing action for the gate end.

In any of the above-mentioned technical solutions, the upper cover is arranged on the water outlet base, a water curtain outlet is provided at a connection position between the upper cover and the water outlet base, and the water curtain outlet is communicated with the main cavity structure.

In any of the above-mentioned technical solutions, Furthermore, a straight line where the central axis of the main cavity structure is located is parallel to a straight line where the central axis of the water inlet pipe is located, and a straight line where a central axis of the threaded pressing rod is located coincides with the straight line where the central axis of the main cavity structure is located.

In any of the above-mentioned technical solutions, the outer wall of the threaded pressing rod is symmetrically provided with longitudinal sliding grooves, the threaded pressing rod is clamped on a vertical guide rail fixed at a corresponding position on an inner wall surface of the main cavity structure through the longitudinal sliding groove.

In any of the above-mentioned technical solutions, the threaded pressing rod has an inner thread cavity comprising an inner thread: an annular washer clamping position is provided on an outer wall surface of the threaded pressing rod near a lower end, the water-sealing washer is sleeved on the washer clamping position.

In any of the above-mentioned technical solutions, further, the pressing rod driver comprises a rotating screw that is rotatably connected to a corresponding connecting position of the upper cover, an upper part of the rotating screw is a screw connecting position, and the outer wall surface of the lower part is provided with the outer thread part that is screwed and matched with the inner thread cavity.

In any of the above-mentioned technical solutions, further, the corresponding connection position of the upper cover comprises an installation hole in the middle of the upper cover, and an upper extension ring platform and a lower extension ring platform respectively extend upward and downward from an outer edge of the installation hole. The upper extension ring platform and the lower extension ring platform are concentric with a top-view projection of the installation hole.

In any of the above-mentioned technical solutions, the outside of the screw connection position is sequentially sleeved from top to bottom with a lock cover, a circlip and a rotating rod fixing member, wherein the locking cover and the rotating rod fixing member are arranged in the corresponding connection position of the upper cover, and form a rotational fit with the corresponding connection position of the upper cover.

In any of the above-mentioned technical solutions, further, the upper end of the rotating screw rod is provided with a plug-in part, and a screwable upper end cover is plugged and fixed on the plug-in part.

In any of the above-mentioned technical solutions, further comprising: a filter screen for filtering incoming water, which is arranged in the water inlet pipe part, and the filter screen is arranged at a position close to the gate end.

The beneficial effects of the present disclosure mainly lie in: a water curtain system with switch, comprising: a main housing, the main housing is integrally formed, and comprises a main cavity structure in the middle, a lower part of the main cavity structure is connected to a water inlet pipe part with an inner diameter smaller than that of the main cavity structure, the connecting port between the main cavity structure and the water inlet pipe part is a gate end that allows water to flow into the main cavity structure through the water inlet pipe part, an upper part of the main cavity structure is integrally provided with a water outlet base, and an upper part of the water outlet base is provided with an upper cover; a threaded pressing rod, which is clamped in the main cavity structure above the gate end through a clamping structure, and a lower end of the threaded pressing rod is provided with a water-sealing washer; a pressing rod driver, which drives the threaded pressing rod to rise and fall through threaded cooperation, so as to complete opening and closing action for the gate end. The present application directly designs a water curtain product with a switch function, which reduces the complexity of installation and the tediousness of product production. While reducing the cost, the user's operation is more convenient, and the user's experience is improved.

It is to be understood that both the foregoing general description and the following detailed description have been presented for purposes of illustration and description and are not necessarily intended to limit the present disclosure. The accompanying drawings, which are incorporated in to and constitute a part of the specification, illustrate the subject matter of the present disclosure. At the same time, the specification and drawings serve to explain the principles of the present disclosure.

BRIEF DESCRIPTION OF DRAWINGS

In order to more clearly illustrate the specific embodiments of the present disclosure or the technical solutions in the prior art, the following briefly introduces the accompanying drawings that are required to be used in the description of the specific embodiments or the prior art. Obviously, the drawings in the following description are some embodiments of the present disclosure, and for those of ordinary skill in the art, other drawings can also be obtained from these drawings without creative effort.

REFERENCE SIGNS

Figure 1:
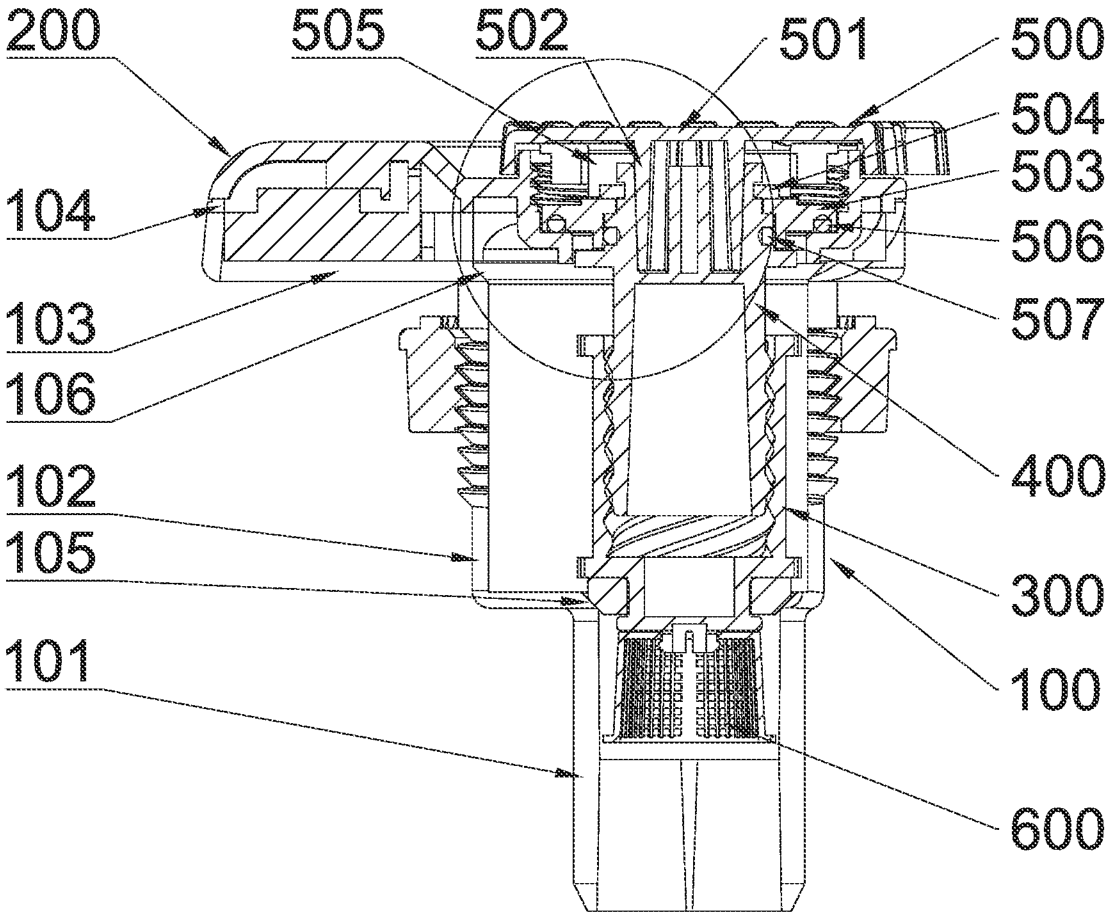
FIG. 1 is a schematic cross-sectional structure diagram according to an embodiment of the present disclosure.

Main casing 100, Water inlet pipe part 101, Main cavity structure 102, Guide rail 1021, Water outlet base 103, Water curtain outlet 104, Gate end 105, Main cavity upper port 106, Main cavity external thread 107, Upper cover 200, Installation groove 201, Installation hole 202, Upper extension ring platform 203, Lower extension ring platform 204, Internal thread clamping position 205, First longitudinal wall surface 206, Stepped shoulder 207, Threaded pressing rod 300, Washer clamping position 301, Water-sealing washer 302, Inner thread cavity 303, Rotating screw 400, External thread portion 401, Inserting groove 402, Convex ring platform 403, First annular groove 404, Second annular groove 405, Handle 500, Upper end cover 501, Inserting part 502, Rotating rod fixing member 503, Circlip 504, Lock cover 505, First sealing ring 506, Second sealing ring 507, Filter screen 600, and Lock nut 700.

DETAILED DESCRIPTION

The technical solutions of the present disclosure will be clearly and completely described below with reference to the accompanying drawings. Obviously, the described embodiments are a part of the embodiments of the present disclosure, but not all of the embodiments.

Based on the embodiments in the present disclosure, all other embodiments obtained by those of ordinary skill in the art without creative efforts shall fall within the protection scope of the present disclosure.

In the description of the present disclosure, it should be noted that the terms center "upper", "lower", "left", "right", "vertical". "horizontal", "inner", "outer", etc., which are used to indicate position or positional relationship, are based on the position or positional relationship shown in the drawings, and are only for the convenience of describing the application and simplifying the description, rather than indicating or implying that the indicated position or element must have a specific orientation and be constructed in a specific orientation and operation, therefore cannot be understood as a limitation of the present application. Furthermore, the terms "first," "second," and "third" are used for descriptive purposes only and should not be construed to indicate or imply relative importance.

In the description of the present disclosure, it should be noted that unless otherwise clearly specified and limited, the terms "installation", and "connection" should be understood in a broad sense, for example, it can be a fixed connection or a detachable connection, or integrally connected; it can be a mechanical connection or an electrical connection; it can be directly connected, or indirectly connected through an intermediate medium, and it can be the internal communication between two components. For those skilled in the art, the specific meaning of the above-mentioned terms in the present application can be understood according to the specific circumstances.

Embodiment 1

A water curtain system with a switch as shown in FIG. 1-6, consist of a main housing 100, the main housing 100 is integrally formed, and comprises a main cavity structure 102 in the middle, a lower part of the main cavity structure 102 is connected to a water inlet pipe part 101 with an inner diameter smaller than that of the main cavity structure 102, the connecting port between the main cavity structure 102 and the water inlet pipe part 101 is a gate end 105 that allows water to flow into the main cavity structure 102 through the water inlet pipe part 101, an upper part of the main cavity structure 102 is integrally provided with a water outlet base 103, and an upper part of the water outlet base 103 is provided with an upper cover 200;

- a threaded pressing rod 300, which is clamped in the main cavity structure 102 above the gate end 105 through a clamping structure, and the lower end of the threaded pressing rod 103 is provided with a water-sealing washer 302;
- a pressing rod driver, which drives the threaded pressing rod 300 to rise and fall through threaded cooperation, so as to complete opening and closing action for the gate end 105.

The water curtain system further comprises a filter screen 600 for filtering incoming water, which is arranged in the water inlet pipe part 101, and the filter screen 106 is arranged at a position close to the gate end 105.

The water enters from the water inlet pipe portion 101, and enters the main cavity structure 102 after filtering the impurities in the water when passing through the filter screen 600. The main cavity structure 102 is provided with a structure for adjusting the water flow. The water passes through the main cavity structure 102 and then passes through the water curtain outlet 104 to form a water curtain effect.

A threaded pressing rod 300 is provided where the water enters the main cavity structure 102: when the handle 500 is rotated clockwise, the handle 500 drives the rotating screw 400 to push the threaded pressing rod 300 down, and the threaded pressing rod 300 drives the water-sealing washer 302 to contact the gate end 105 to complete the water-sealing closing effect. On the contrary, it is the state of turning-on effect.

The tipper cover 200 is arranged on the water outlet base 103, and a water curtain outlet is provided at a connection position between the upper cover 200 and the water outlet base 103, and the water curtain outlet 104 is communicated with the main cavity structure 102. In this technical solution, in addition to the current technology of ultrasonic wire bonding, there are various public welfare methods or connection structures to connect the tipper cover and the water outlet base together, which will not be repeated here.

A straight line where a central axis of the main cavity structure 102 is located is parallel to a straight line where a central axis of the water inlet pipe 101 is located, and a straight line where a central axis of the threaded pressing rod 300 is located coincides with the straight line where the central axis of the main cavity structure 102 is located.

The outer wall of the threaded pressing rod 300 is symmetrically provided with longitudinal sliding grooves, the threaded pressing rod 300 is clamped on a vertical guide rail 1021 fixed at a corresponding position on an inner wall surface of the main cavity structure 102 through the longitudinal sliding groove.

A main cavity external thread 107 is provided on the outer wall surface of the main cavity structure, and a lock nut 700 is screwed to the outside of the main cavity structure through the main cavity external thread. A water outlet base 103 extends outward from the upper end of the main cavity structure, and the water outlet base 103 is a flat-plate type container structure. The position where the main cavity structure and the water outlet base are connected is the upper port 106 of the main cavity. Water enters at the gate end, and enters the water outlet cavity structure composed of the main cavity base 103 and the upper cover 200 through the upper port of the main cavity, and then exits through the water curtain outlet to form a water curtain system.

Embodiment 2

The water curtain system in this embodiment is an improvement on the basis of Embodiment 1. The technical content disclosed in Embodiment 1 is not described repeatedly, and the content disclosed in Embodiment 1 also belongs to the content disclosed in this embodiment.

The embodiments of the present disclosure also provide a water curtain system with a switch, comprising the water curtain structure of any of the above technical solutions, and therefore, it has all the beneficial technical effects of the water curtain structure, which will not be repeated here.

Figure 5:
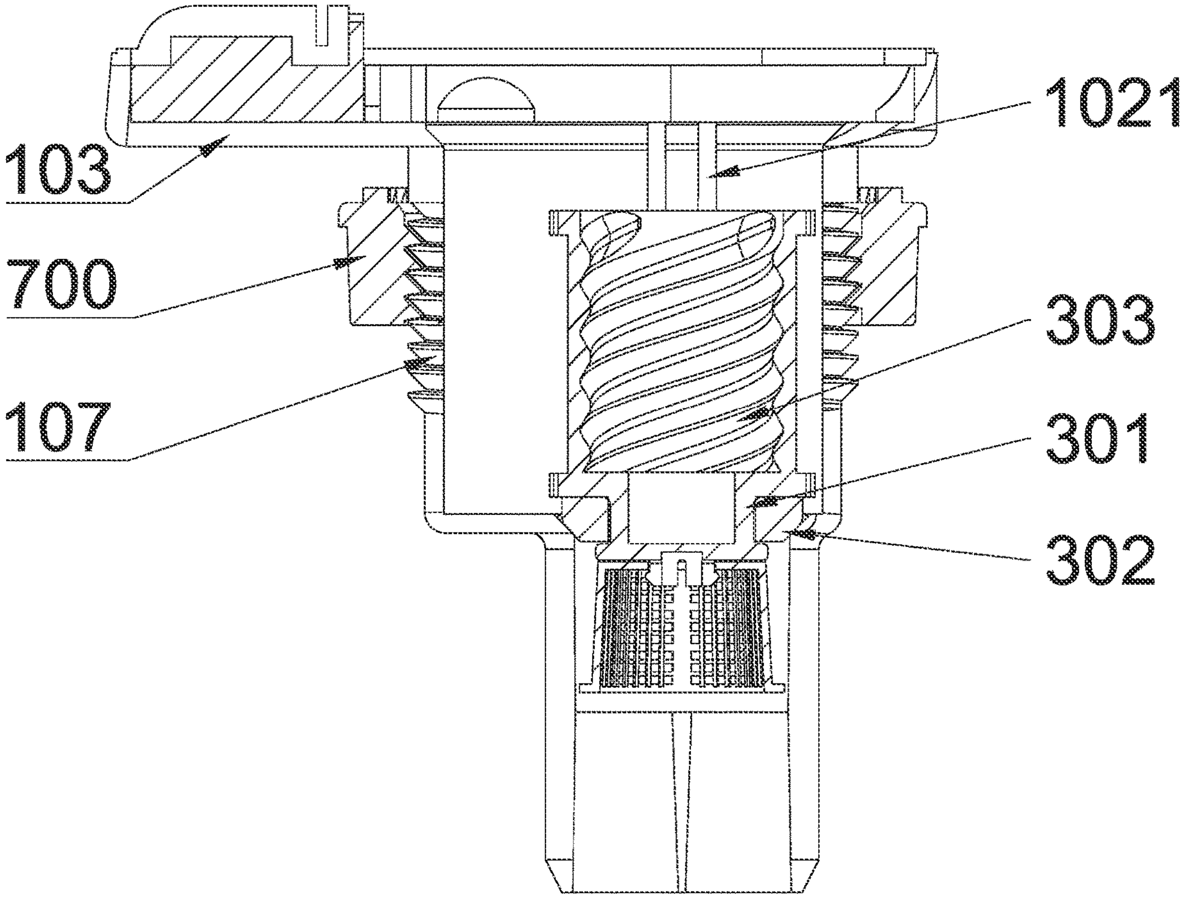
FIG. 5 is a schematic structural diagram of a main housing according to an embodiment of the present disclosure.
Figure 6:
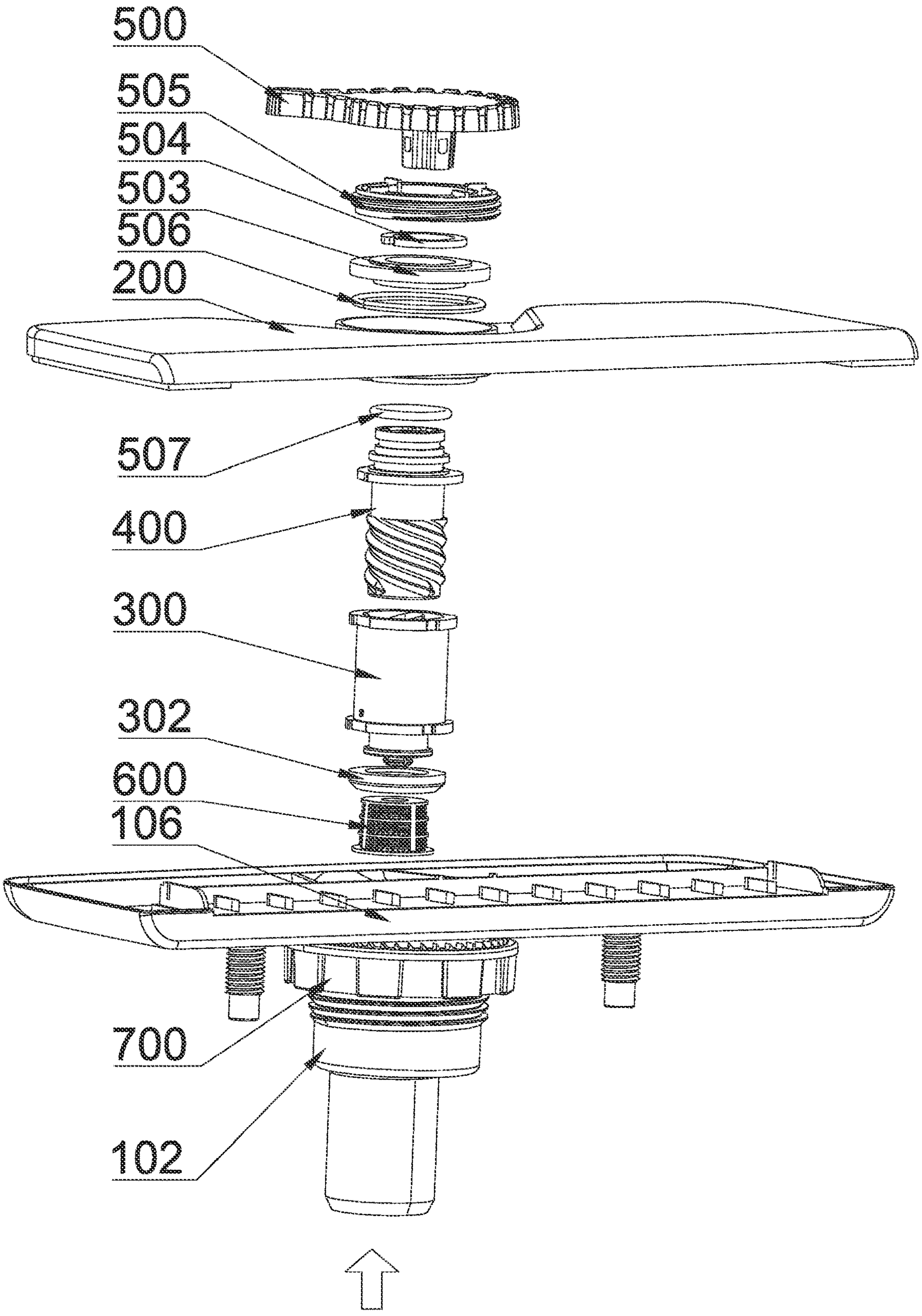
FIG. 6 is a schematic exploded structural diagram according to an embodiment of the present disclosure.

As shown in FIGS. 1 and 5, the threaded pressing rod 300 has an inner thread cavity 303 comprising an inner thread; an annular washer clamping position 301 provided on an outer wall surface of the threaded pressing rod 300 near a lower end, the water-sealing washer 302 is sleeved on the washer clamping position 301. The pressing rod driver drives the threaded pressing rod to move up and down through the screw thread.

The pressing rod driver made up of a rotating screw 400 that is rotatably connected to a corresponding connecting position of the upper cover 200, an upper part of the rotating screw 400 is a screw connecting position, and an outer wall surface of the lower part of the rotating screw is provided with an outer thread part 401 that is screwed and matched with the inner thread cavity 303.

The corresponding connection position of the upper cover 200 comprises an installation hole 202 in a middle of the upper cover 200, and an upper extension ring platform 203 and a lower extension ring platform 204 respectively extend upward and downward from an outer edge of the installation hole 202, the upper extension ring platform 203 and the lower extension ring platform 204 are concentric with a top-view projection of the installation hole. The connection position is a longitudinal through-cavity structure.

Figure 4:
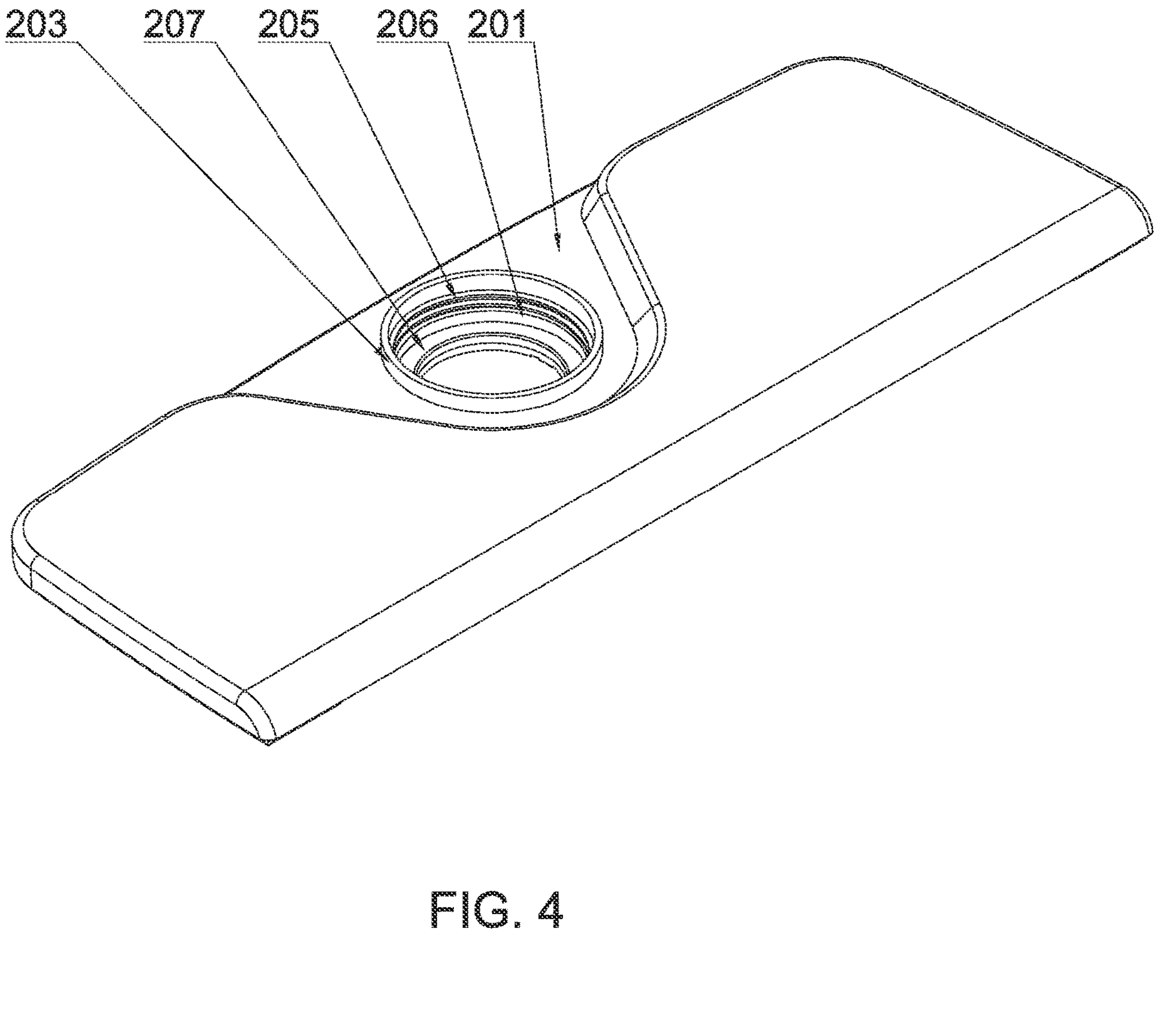
FIG. 4 is a schematic structural diagram of the shaft side of the upper cover according to an embodiment of the present disclosure.

On the upper cover outside the installation hole, there is a sunken installation slot 201, the structure of which is shown in FIG. 4, for the purpose of leaving space for the handle so that the handle is not too obtrusive. The horizontal position of the upper end surface of the handle should be as flush as possible or slightly higher than the horizontal position of the upper end surface of the non-sunk area of the upper cover. This ensures the aesthetics of the structure and the convenience of use.

Figure 2:
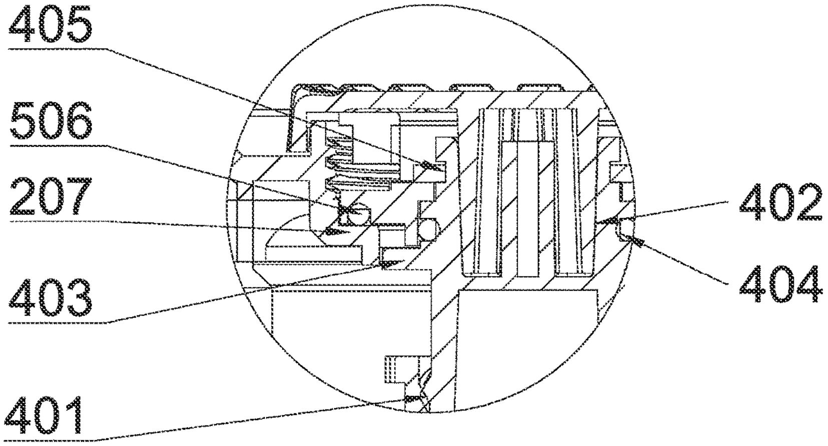
FIG. 2 is an enlarged schematic diagram of a partial structure of FIG. 1 according to an embodiment of the present disclosure.
Figure 3:
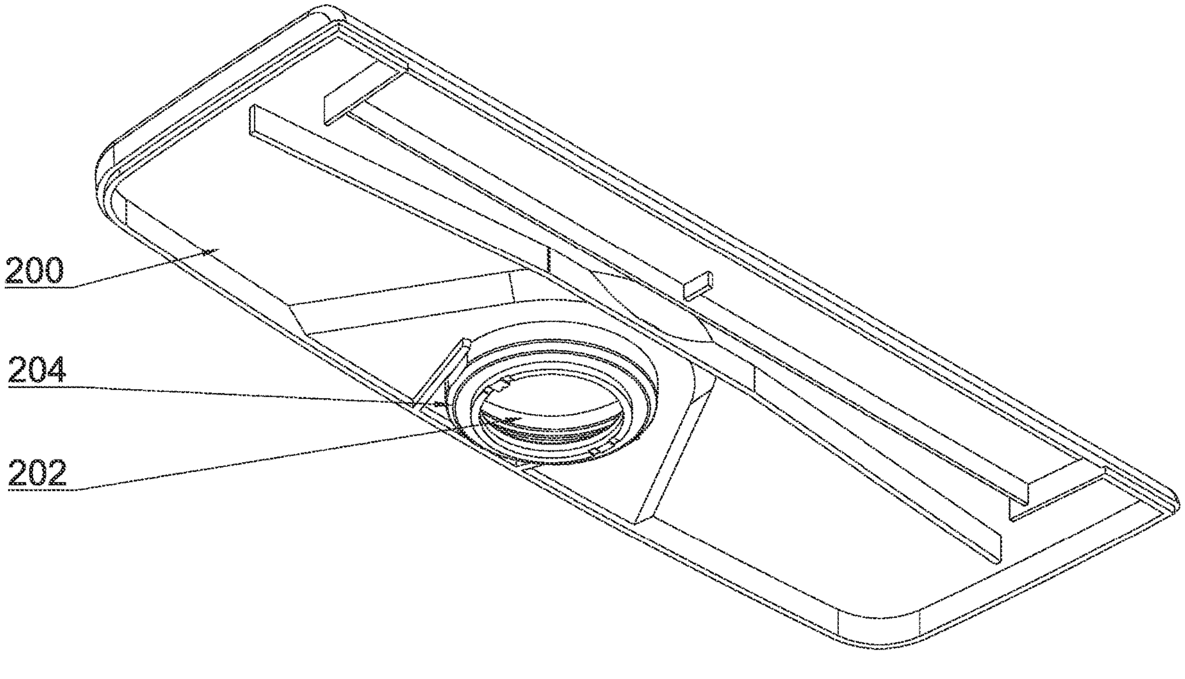
FIG. 3 is a schematic structural diagram of an upper cover in an embodiment of the disclosure.

The outside of the screw connection position is sequentially sleeved from top to bottom with a lock cover 505, a circlip 504 and a rotating rod fixing remember 503, wherein the locking cover 505 and the rotating rod fixing member 503 are arranged in the corresponding connection position of the upper cover 200, and form a rotational fit with the corresponding connection position of the upper cover 200. Specifically, as shown in FIG. 2 and FIG. 4, the inner wall of the connection position is provided with an internal thread clamping position 205, a first longitudinal wall surface 206 and a stepped shoulder 207. In this design, an external thread is provided on the outside of the lock cover, which is screwed with the internal thread clamping position 205. The inner side of the corresponding first longitudinal wall surface 206 is clamped with a rotating rod fixing member 503. A first sealing ring 506 is provided between the rotating rod fixing member 503 and the stepped shoulder, and a ring groove for clamping the first sealing ring 506 is provided at the corresponding position of the rotating rod fixing member, and the design here improves the airtightness of the structure. A second sealing ring 507 is provided between the inner wall surface of the rotating rod fixing member and the second annular groove 405 on the upper part of the rotating screw.

As shown in FIG. 2, a first annular groove is further provided on the outer wall surface of the rotating screw above the second annular groove, and the first annular groove 404 is used to define the circlip 504.

The upper end of the rotating screw 400 is provided with an inserting groove 402, and a screwable upper end cover 501 is inserted and fixed on the inserting groove 402.

The lower part of the upper part of the connecting structure of the rotating screw 400 of the present design is provided with a convex ring platform 403, and the convex ring platform 403 can ensure that the rotating screw 400 is locked in the upper cover position and will not drop due to rotation.

Embodiment 3

The water outlet structure in this embodiment is not limited to the above two, and other forms of water outlet structure can be freely selected according to actual working conditions to realize the function of the water outlet. The water outlet structure in this embodiment is an improvement on the basis of Embodiment 1 and Embodiment 2. The technical content disclosed in Embodiment 1 and Embodiment 2 will not be described repeatedly, and the disclosed content in Embodiment 1 and Embodiment 2 is also described. It belongs to the content disclosed in this embodiment.

The embodiment of the present disclosure also provides a water curtain system with switch, comprising a main housing 100, the main housing 100 is integrally formed, and comprises a main cavity structure 102 in the middle, a lower part of the main cavity structure 102 is connected to a water inlet pipe part 101 with an inner diameter smaller than that of the main cavity structure 102, the connecting port between the main cavity structure 102 and the w % ater inlet pipe part 101 is a gate end 105 that allows water to flow into the main cavity structure 102 through the water inlet pipe part 101; a threaded pressing rod 300, which is clamped in the main cavity structure 102 above the gate end 105 through a clamping structure, and a lower end of the threaded pressing rod 103 is provided with a water-sealing washer 302; a pressing rod driver, which drives the threaded pressing rod 300 to rise and fall through threaded cooperation, so as to complete opening and closing action for the gate end 105.

In this design, the main cavity structure and the threaded pressing rod 300 are coaxial or not coaxial, and the top-view projected area of the main cavity structure covers the top-view projected area of the threaded pressing rod. Therefore, when the threaded pressure rod 300 rises, the water enters into the main cavity structure. The main cavity structure is connected with a w ater outlet, and the water outlet is arranged on the side wall of the main cavity structure or the upper part of the main cavity structure.

Embodiment 4

Figure 7:
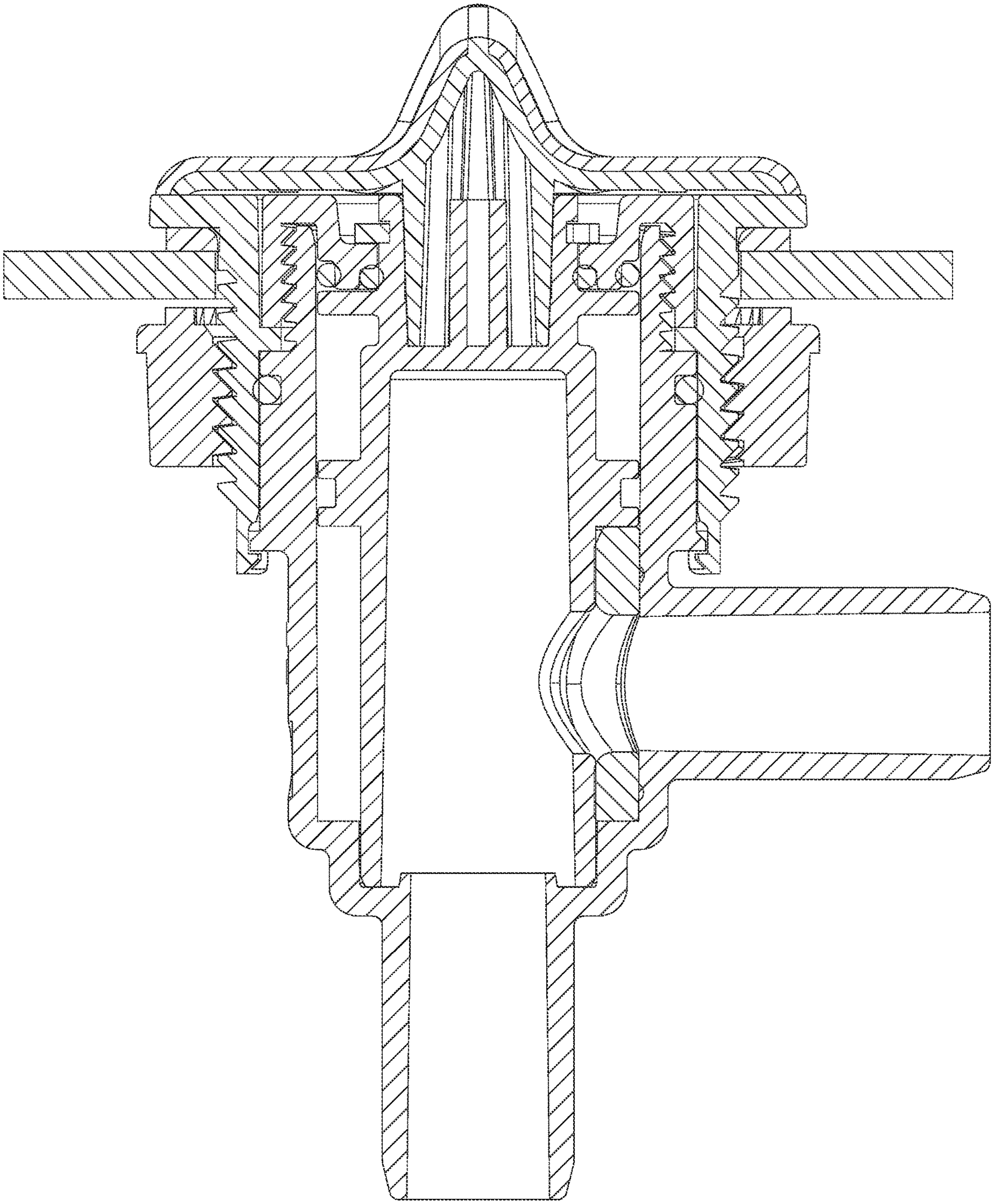
FIG. 7 is a schematic cross-sectional structural diagram according to a new embodiment.

This design is based on Embodiments 1 to 3, and is different from Embodiments 1 to 3, mainly in the water inlet structure and the water outlet structure. As shown in FIG. 7, the water curtain system with switch also comprises a main cavity structure, and a water inlet pipe is arranged at the lower part of the main cavity structure. As shown in FIG. 7, a water outlet pipe is arranged on the side wall of the main cavity structure.

A horizontal rotary valve is arranged in the main cavity structure, the rotary valve is a cylindrical structure with an open bottom, and the upper end of the cylindrical structure is provided with a linkage piece connected to the upper hand-held knob.

The wall surface of the cylindrical structure is provided with a through hole concentric with the water outlet end of the water outlet pipe. Therefore, the preferred solution for this embodiment is an L-shaped water channel. The water channel is opened and closed through a cylindrical structure. When the through hole is concentric with the water outlet end of the water outlet pipe, the water in the water inlet structure will enter the water outlet pipe through the lower opening and the through hole of the cylindrical structure, and the water will be discharged.

When the upper hand-held knob is rotated, the through hole moves horizontally and is dislocated from the water outlet, and the L-shaped water channel is cut off by the wall of the cylindrical structure to form a valve structure.

Finally, it should be noted that the above embodiments are only used to illustrate the technical solutions of the present disclosure, but not to limit them; although the present disclosure has been described in detail with reference to the foregoing embodiments, those of ordinary skill in the art should understand that: The technical solutions described in the foregoing embodiments can still be modified, or some or all of the technical features thereof can be equivalently replaced. However, these modifications or substitutions do not change the essence of the corresponding technical solutions, which means they do not deviate from the scope of the technical solutions of the embodiments of the present disclosure.

What is claimed is:

1. A water curtain system, comprising: a main housing, the main housing is integrally formed, and comprises a main cavity structure in the middle, a lower part of the main cavity structure is connected to a water inlet pipe part by a connecting port with an inner diameter smaller than that of the main cavity structure, the connecting port between the main cavity structure and the water inlet pipe part is a gate end that allows water to flow into the main cavity structure through the water inlet pipe part, an upper part of the main cavity structure is integrally provided with a water outlet base, and an upper part of the water outlet base is provided with an upper cover;

a threaded pressing rod, which is clamped in the main cavity structure above the gate end through a clamping structure, and a lower end of the threaded pressing rod is provided with a water-sealing washer;

a pressing rod driver, which drives the threaded pressing rod to rise and fall through threaded cooperation, so as to complete opening and closing action for the gate end.

2. The water curtain system according to claim 1, wherein the upper cover is arranged on the water outlet base, and a water curtain outlet is provided at a connection position between the upper cover and the water outlet base, and the water curtain outlet is communicated with the main cavity structure.

3. The water curtain system according to claim 1, wherein a straight line where a central axis of the main cavity structure is located is parallel to a straight line where a central axis of the water inlet pipe is located, and a straight line where a central axis of the threaded pressing rod is located coincides with the straight line where the central axis of the main cavity structure is located.

4. The water curtain system according to claim 1, wherein an outer wall of the threaded pressing rod is symmetrically provided with longitudinal sliding grooves, the threaded pressing rod is clamped on a vertical guide rail fixed at a corresponding position on an inner wall surface of the main cavity structure through the longitudinal sliding groove.

5. The water curtain system according to claim 1, wherein the threaded pressing rod has an inner thread cavity comprising an inner thread; an annular washer clamping position is provided on an outer wall surface of the threaded pressing rod near a lower end, the water-sealing washer is sleeved on the washer clamping position.

6. The water curtain system according to claim 5, wherein the pressing rod driver comprises a rotating screw that is rotatably connected to a corresponding connecting position of the upper cover, an upper part of the rotating screw is a screw connecting position, and an outer wall surface of the lower part is provided with an outer thread part which is screwed and matched with the inner thread cavity.

7. The water curtain system according to claim 6, wherein the corresponding connection position of the upper cover comprises an installation hole in a middle of the upper cover, and an upper extension ring platform and a lower extension ring platform respectively extend upward and downward from an outer edge of the installation hole, the upper extension ring platform and the lower extension ring platform are concentric with a top-view projection of the installation hole.

8. The water curtain system according to claim 6, wherein an outside of the screw connection position is sequentially sleeved from top to bottom with a lock cover, a circlip and a rotating rod fixing member, wherein the locking cover and the rotating rod fixing member are arranged in the corresponding connection position of the upper cover, and form a rotational fit with the corresponding connection position of the upper cover.

9. The water curtain system according to claim 7, wherein an outside of the screw connection position is sequentially sleeved from top to bottom with a lock cover, a circlip and a rotating rod fixing member, wherein the locking cover and the rotating rod fixing member are arranged in the corresponding connection position of the upper cover, and form a rotational fit with the corresponding connection position of the upper cover.

10. The water curtain system according to claim 6, wherein the upper end of the rotating screw rod is provided with a plug-in part, and a screwable upper end cover is plugged and fixed on the plug-in part.

11. The water curtain system according to claim 1, wherein further comprising: a filter screen for filtering incoming water, which is arranged in the water inlet pipe part, and the filter screen is arranged at a position close to the gate end.

* * * * *